United States Patent [19]
Nakamura

[11] Patent Number: 4,468,005
[45] Date of Patent: Aug. 28, 1984

[54] LEVER HOIST

[75] Inventor: Takayoshi Nakamura, Atsugi, Japan

[73] Assignee: Kabushiki Kaisha Kito, Kawasaki, Japan

[21] Appl. No.: 469,653

[22] Filed: Feb. 25, 1983

[30] Foreign Application Priority Data

Mar. 1, 1982 [JP] Japan ............................ 57-27162[U]

[51] Int. Cl.[3] ......................... B66F 19/00; B66F 3/30; G05G 1/12; F16D 13/42

[52] U.S. Cl. .................................... 254/350; 254/352; 254/353; 254/357; 74/577 M; 192/43.1; 192/93 A

[58] Field of Search ............... 254/357, 346, 347, 217, 254/218, 352, 353, 354, 369, 350; 74/577 M, 577 SF, 577 S, 577 R; 192/20, 21, 43.1, 93 A, 95

[56] References Cited

U.S. PATENT DOCUMENTS 2,165,984 7/1939 Schroeder ....................... 254/352 X
2,531,668 11/1950 Briggs ................................ 254/347
3,107,899 10/1963 Henneman .......................... 254/347
3,939,729 2/1976 Brockelsby .................. 74/577 M X

FOREIGN PATENT DOCUMENTS 55-2570 1/1980 Japan .................................. 254/352

*Primary Examiner*—Stuart S. Levy
*Assistant Examiner*—Joseph J. Hail, III
*Attorney, Agent, or Firm*—Sughrue, Mion, Zinn, Macpeak and Seas

[57] ABSTRACT

A lever hoist comprises a change gear for driving a sheave for winding-up a chain or rope for a load, an operating lever rockably driven by a hand, winding-up and winding-off driving pawls engageable with teeth of the change gear and changeable in response to the purpose of hoisting or lowering the load, and a braking assembly for preventing the change gear from being driven by a gravity of the load and having a spring for releasing the braking assembly. According to the invention, the winding-up and winding-off driving pawls are formed in a unitary member pivotally secured to the operating lever and opposite portions of the pawls of the unitary member are engageable with a holding member urged by a spring, and a distance between a center of the pivot shaft and the portion associated with the winding-off driving pawl is larger than a distance between the center of the pivot shaft and the portion associated with the winding-up driving pawl, so that the winding-off pawl is urged against the teeth with a larger force than that of the winding-up pawl urged against the teeth. With such an arrangement, when a light load is hoisting up, the return movement of the operating lever does not carry along the change gear. When a light load which does not operate the braking assembly is lowering, the large urging force of the winding-off driving pawl prevents the change gear from rotating against the winding-off driving pawl.

1 Claim, 8 Drawing Figures

LEVER HOIST

BACKGROUND OF THE INVENTION

1. Field of the Invention

The present invention relates to a lever hoist for use in raising, lowering or dragging objects to be transferred by repeatedly rocking a lever of the hoist.

2. Description of the Prior Art

Lever-operated small type hoisting and dragging devices have been known. One of these devices includes an elastic resistance member interposed between a driving member and a driven member for releasing a braking assembly, and an operating lever rockable about the driving member. The operating lever includes a change pawl metal pivotally secured thereto having winding-up and winding-off driving pawls detachably engageable with a change gear on the driving member for respectively driving the change gear in winding-up and winding-off directions and engagement portions for respectively holding the winding-up and winding-off directions. The operating lever is further provided with a holding member adapted to be detachably engaged with the engagement portions of the change pawl metal by means of an engagement spring. With such a device, urging forces of the pawls engaged with the change gear are substantially equal to each other.

With the known device, if the urging force of the winding-up driving pawl acting upon the change gear by the action of the engagement spring is too large, the change gear and hence the driving member are returned by a return movement of the operating lever for a next driving movement when a light load is hoisting by the device. Accordingly, such a device cannot hoist a light load. On the other hand, when a light load is lowering by the device, the urging force of the winding-off driving pawl acting upon the change gear by the engagement spring is too small, the change gear overcomes the weak urging force so as to be rotated by a gravity force of the load, because such a light load does not operate the braking assembly. Frequently, the known device cannot therefore lower a light load.

SUMMARY OF THE INVENTION

It is an object of the invention to provide an improved lever hoist which eliminates the above disadvantages of the prior art by providing a larger urging force of a winding-up driving pawl and a smaller urging force of a winding-off driving pawl against a change gear.

A lever hoist including a change gear provided on a driving member for driving a sheave about which is wound up a chain, rope or the like for a load, an operating lever rockable about said driving member by a hand, a winding-up driving pawl engageable with teeth of said change gear and driven by said operating lever in a winding-up direction for the load, a winding-off driving pawl engageable with the teeth of said change gear and driven by said operating lever in a winding-off direction for the load, and a braking assembly preventing said change gear from being driven from a side of said sheave and having an elastic resistance member directly or indirectly engaging said driving member for releasing said braking assembly, according to the invention said lever hoist comprises urging means for urging said winding-up and winding-off driving pawls against said teeth of said change gear in a manner such that said winding-off driving pawl is urged against said teeth with a larger force than that of said winding-up driving pawl urged against said teeth.

In a preferred embodiment of the invention, the urging means comprises an urging spring housed in the operating lever and a holding member urged by the urging spring to move the winding-up and winding-off driving pawls against the teeth of the change gear. The winding-up and winding-off driving pawls are formed in a unitary member pivotally secured to the operating lever by means of a pivot shaft, and opposite portions to the pawls of the unitary member are made engageable with the holding member and serve as winding-up and winding-off direction holding portions for holding the winding-up and winding-off driving pawls relative to the operating lever, respectively. A distance between a center of the pivot shaft and the winding-off direction holding portion is larger than a distance between the center of the pivot shaft and the winding-up direction holding portion of the unitary member.

The invention will be more fully understood by referring to the following detailed specification and claims taken in connection with the appended drawings.

DETAILED DESCRIPTION OF THE PREFERRED EMBODIMENT

Figure 1:
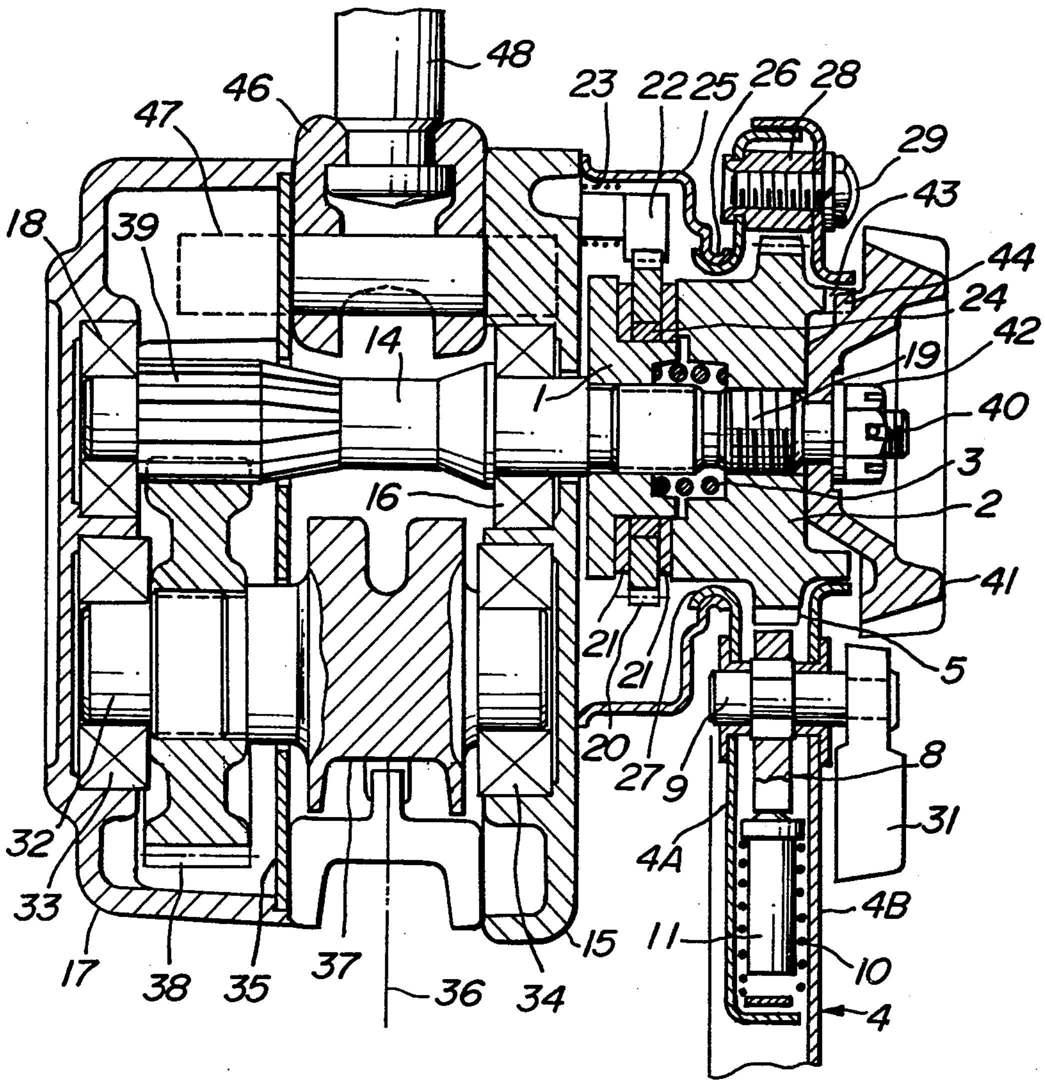
FIG. 1 is a sectional view of a lever hoist of one embodiment of the invention.
Figure 2:
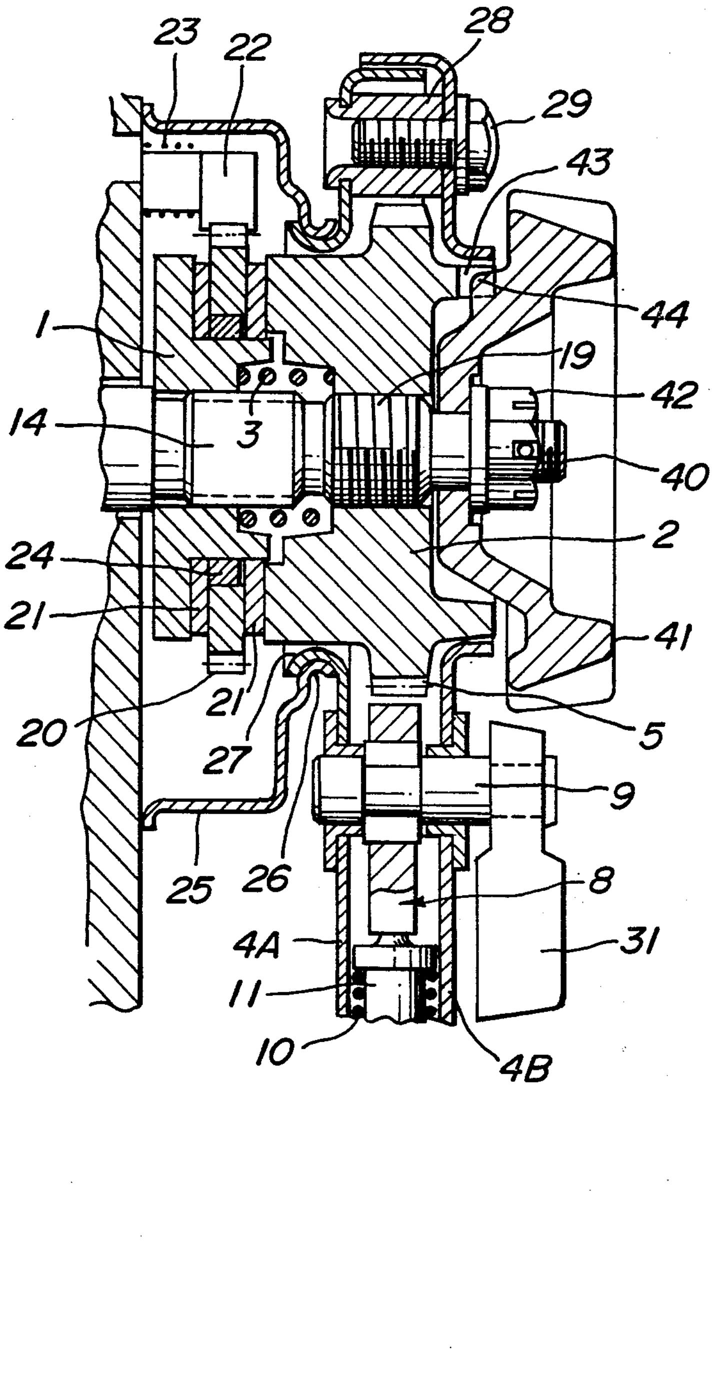
FIG. 2 is an enlarged partial sectional view illustrating a driving portion with an operating lever and a braking assembly of the lever hoist shown in FIG. 1.

Referring to FIGS 1–6 illustrating one embodiment of the invention, a driving shaft 14 is journaled at its mid portion by a bearing 16 in a frame 15 and has one end journaled by a bearing 18 in a gear box 17 and the other end formed with external screw threads 19 for a braking assembly adapted to be threadedly engaged with internal screw threads of a driving member 2 having change gear teeth 5. A driven member 1 is fitted against rotation on the driving shaft 14 between the frame 15 and driving member 2 and abuts against an enlarged diameter portion of the driving shaft 14 journaled by the bearing 16.

Between the driving member 2 and the driven member 1 are interposed a brake ratchet wheel 20 and friction plates 21 abutting against opposite sides thereof. A brake pawl 22 pivotally secured to the frame 15 is brought into engagement with the brake ratchet wheel 20 by an engagement spring 23. The brake ratchet wheel 20 has a center hole within which is fitted an oilless bearing 24 of a sintered alloy. The ratchet wheel 20, friction plates 21 and bearing 24 are fitted on a reduced diameter portion of the driven member 1 to form a braking assembly. Moreover, between the driving and driven members 2 and 1 is interposed a released brake position holding elastic resistance member 3 made of a coil spring which serves to prevent the driving member 2 from moving in its braking direction. In hoisting and lowering a heavy load, the driving shaft 14 tends to be rotated by a gravity of the load, so that when the driving shaft 14 is rotated, the driving member 2 is moved against the coil spring 3 to the left as viewed in FIG. 1 because of the threaded engagement of the driving shaft 14 and driving member 2. Accordingly, the driving member 2 urges the ratchet wheel 20 and friction plates 21 against the driven member so that the driving shaft 14 is prevented from rotating with the aid of the brake pawl 22 connected to the frame 15.

The driven member 1, brake ratchet wheel 20, friction plates 21, brake pawl 22 and part of the driving member 2 are covered by a metal brake cover 25 formed on one side by pressing with a fixed support ring 26 having a U-shaped cross-section in opposition to an intermediate outer circumferential surface of the driving member 2. An inner lever component member 4A made of metal plates is formed on its bottom portion associated with the brake cover 25 by pressing with a rotatable support ring 27 which is adapted to be fitted in the fixed support ring 26 rotatable but against axial movement relative thereto in a manner enclosing the support ring 26.

Cylindrical spacers 28 having internal screw threads are fitted and fixed by calking in apertures of the bottom portion of inner level component members 4A and 4B which are joined by connecting bolts 29 threadedly engaged within the spacers 28 to form an operating lever 4 rockable about a center line of a change gear 5.

The brake cover 25 is fixed on the side opposite to the fixed support ring 26 to the frame 15 by means of bolts (not shown). A handle or knob 31 is fixed to a pivot shaft 9 rotatably supported in the operating lever 4. To the pivot shaft 9 is fixed a change pawl metal 8 including a winding-up direction driving pawl 6 and a winding-off direction driving pawl 7 which are detachably engageable with the change gear 5 and a winding-up direction holding engagement portion 12, a winding-off direction holding engagement portion 13 and a neutral position holding engagement portion 30 (FIGS. 3, 4 and 5).

A channel-shaped journal metal 45 is arranged in the inner lever component member 4A and is fixed thereat by spot welding as shown at 49. A holding member 11 is arranged movable toward and away from the change pawl metal 8 to detachably engage the winding-up direction holding engagement portion 12, winding-off direction holding engagement portion 13 and neutral position holding engagement portion 30 by means of an engagement or urging spring 10 located in the journal metal 45. A distance $D_2$ between a center of the pivot shaft 9 and the winding-off direction holding engagement portion 13 of the change pawl metal 8 is larger than that $D_1$ between the center of the pivot shaft 9 and the winding-up direction holding engagement portion 12.

Figure 3:
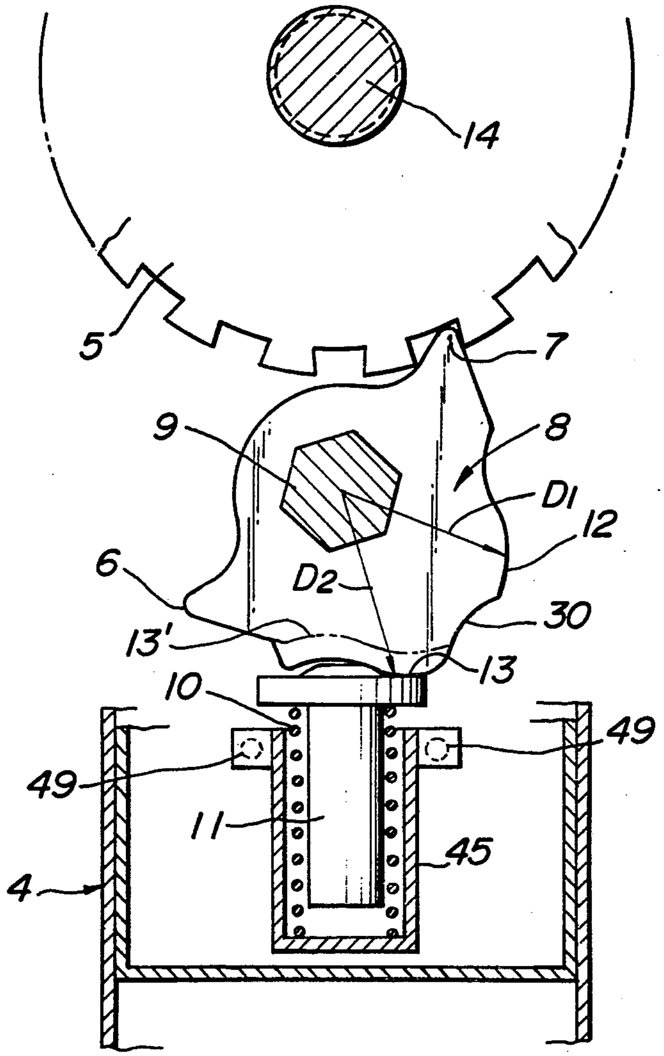
FIG. 3 is a front elevation, partially in section, showing a winding-off driving pawl in engagement with a change gear of the lever hoist shown in FIG. 1.
Figure 4:
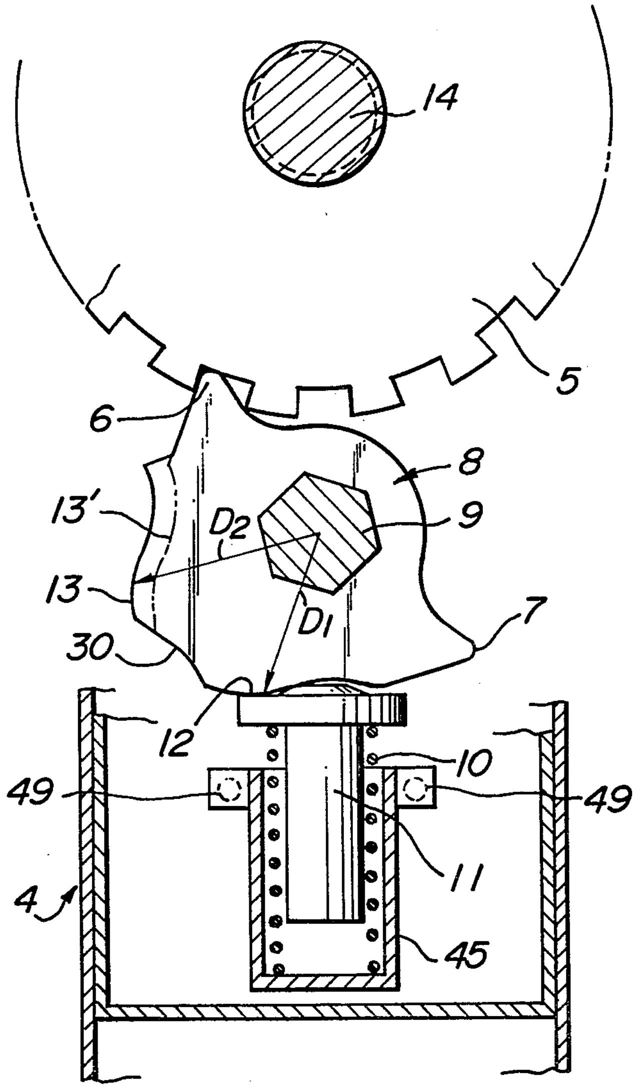
FIG. 4 is a front elevation, partially in section, showing a winding-up driving pawl in engagement with the change gear of the lever hoist shown in FIG. 1.
Figure 5:
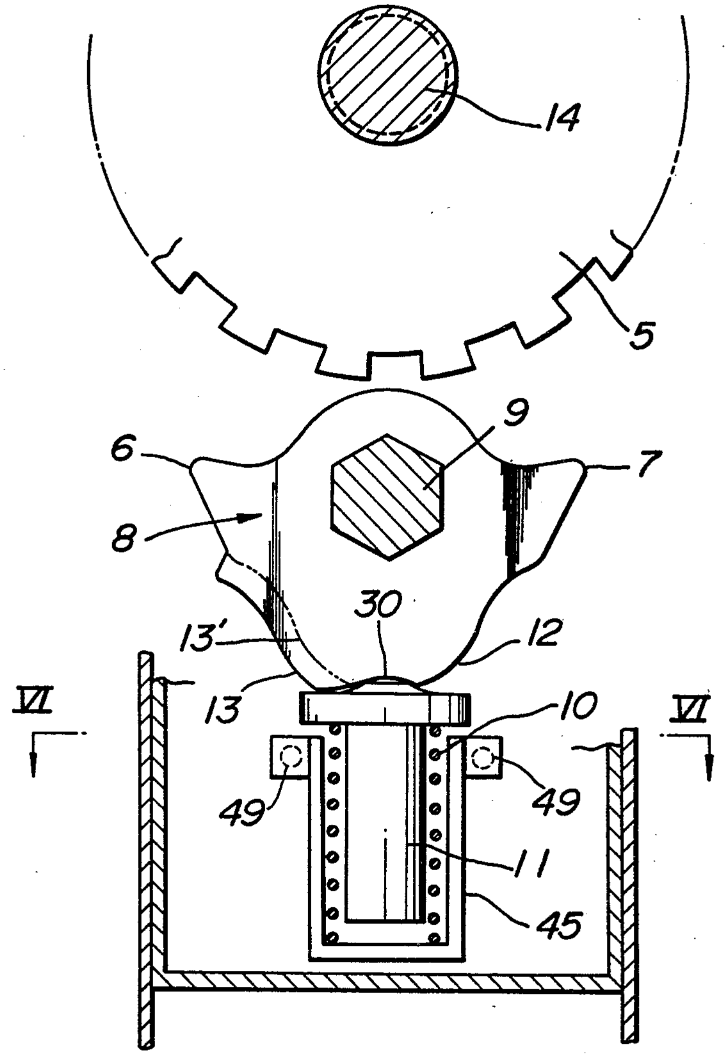
FIG. 5 is a front elevation, partially in section, showing the pawls in a neutral position of the lever hoist shown in FIG. 1.
Figure 6:
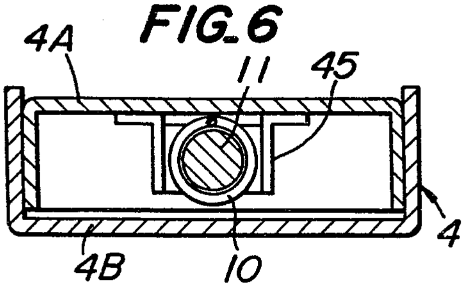
FIG. 6 is a sectional view taken along a line VI—VI in FIG. 5.

As can be seen from phantom lines 13' in FIGS. 3–5 which are symmetrical lines of the contour of the winding-up direction holding engagement portion 12, the winding-off direction holding engagement portion 13 outwardly extends beyond the lines 13'. As shown in FIG. 3, therefore, when the holding member 11 engages the winding-off direction holding engagement portion 13, the engagement spring 10 is compressed more than in case of the winding-up direction holding engagement portion 12 in engagement with the holding member 11. Hence the winding-off direction driving pawl 7 is urged against the change gear 5 with a larger compressive force than in the driving pawl 6. The reason why the distance $D_2$ determines the urging force of the driving pawl 7 is the fact that when the driving pawl 7 engages the change gear 5, the engagement portion 13 on an opposite side of the pawl 7 with respect to the pivot shaft 9 abuts against the holding member 11.

On the other hand, when the holding member 11 engages the engagement portion 12 as shown in FIG. 4, the engagement spring 10 is less compressed and the driving pawl 6 is urged against the change gear 5 with a smaller compressive force than in the driving pawl 7. The reason why the distance $D_1$ determines the urging force of the driving pawl 6 is the fact that when the pawl 6 engages the gear 5, the engagement portion 12 is on an opposite side of the pawl 6 with respect to the pivot shaft 9 and abuts against the holding member 11.

FIG. 5 illustrates the change pawl metal 8 in a neutral position wherein the holding member 11 engages the neutral position holding engagement portion 30.

Turning back to FIG. 1, a driven shaft 32 is arranged in parallel with and under the driving shaft 14. One end of the shaft 32 is journaled in a bearing 33 in the gear box 17 of which opening is closed by a cover plate 35 fitted therein and the other end is journaled in a bearing 34 in the frame 15. The driven shaft 32 is formed integrally with a load sheave 37 between the frame 15 and cover plate 35 for winding a chain 36 (symbolically shown in a chain line in FIG. 1) thereabout. In the gear box 17, the driven shaft 32 is provided with a large gear 38 fixed thereto adapted to engage a pinion 39 formed in the end of the driving shaft 14.

The driving shaft 14 is further provided on the other reduced diameter end 40 with a quick-manually operated knob 41 fitted thereon and fixed thereto by a knob fixing nut 42 which is threadedly engaged with the reduced diameter end 40 by means of locking means such as a split pin or the like. The driving member 2 is formed in its outer end portion with an engagement groove 43 for receiving an engagement protrusion 44 provided in an inner end portion of the knob 41.

Under a no-load condition, the braking assembly is released by an action of the elastic resistance member 3. The change pawl metal 8 is then changed into its neutral position (FIG. 5) to move both the driving pawls 6 and 7 away from the change gear 5. Thereafter the knob 41 is gripped and rotated to rotate the driving shaft 14 and driving member 2 and hence the load sheave 37, thereby rapidly effecting positional adjustment of the load chain 36.

In FIG. 1, an upper hook 48 is anchored to a hook support metal 46 mounted on a support rod 47 extending between the frame 15 and gear box 17.

In carrying out the invention, the manually-operated knob 41 may be integrally formed with the driving member 2, and the elastic resistance member 3 for holding the released braking assembly may be positioned between the driving member or the knob and a shoulder formed in the driving shaft.

Figure 7:
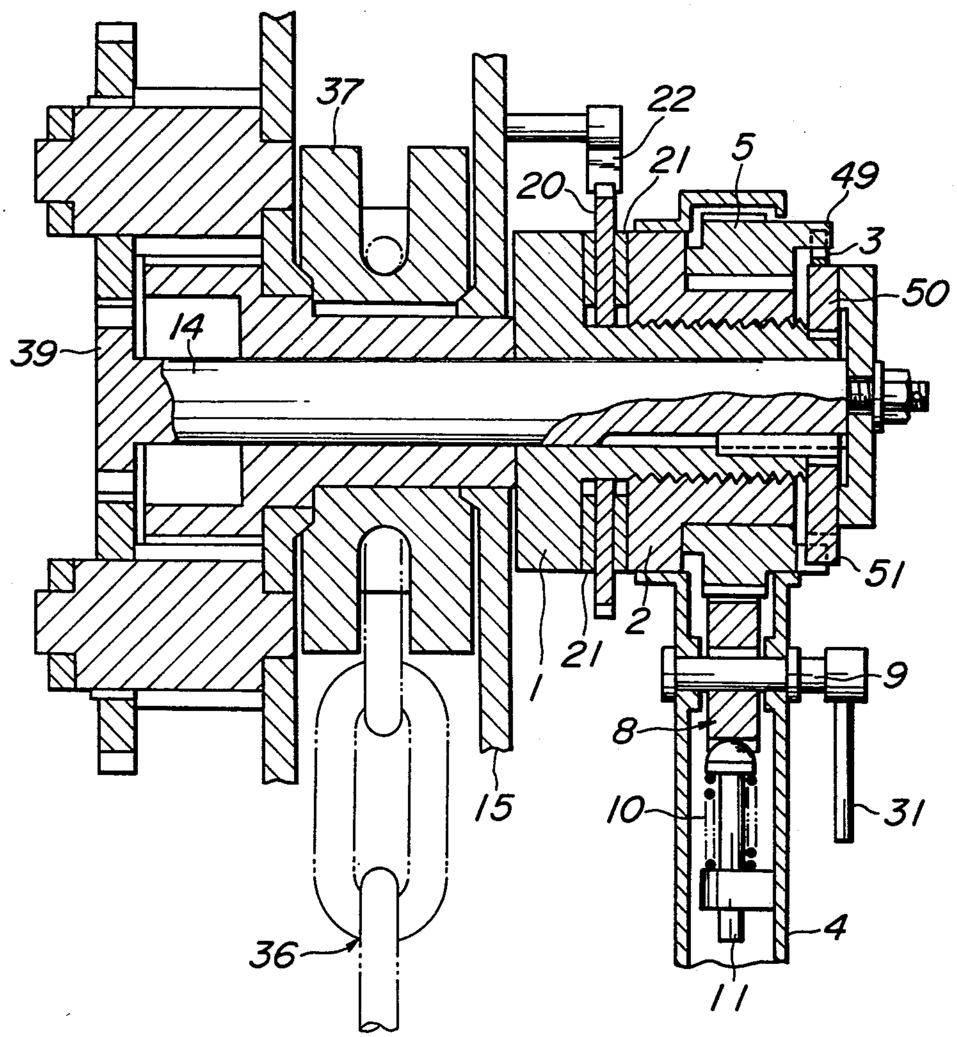
FIG. 7 is a sectional view of another type lever hoist to be applied with the invention.
Figure 8:
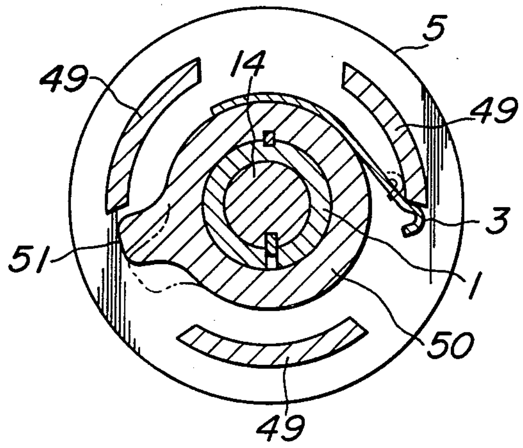
FIG. 8 is a cross-sectional view of the proximity of an elastic resistance member mounting portion of the lever hoist shown in FIG. 7.

It is understood that the invention can be applied to another small type lever-operated hoisting and dragging device as shown in FIGS. 7 and 8, wherein like components have been designated by the same reference numerals. With such device, to a driving shaft 14 is fixed a driven member 1 on which is threadedly engaged a driving member 2. A change gear 5 is fitted on an outer surface of the driving member 2 against rotation relative thereto. The gear 5 is integrally provided at its one end with a plurality of engagement members 49 circumferentially spaced with each other. A holding member 50 is integrally formed with anchoring protrusions 51 adapted to be positioned between the adjacent engagement member 49 when the holding member 50 is fitted on one end of the driven member 1 against rotation relative thereto. A released brake position holding elastic resistance member 3 made of a leaf spring has a fixed end and is adapted to engagement members 49. A construction and operation of such a lever operated hoisting and dragging device shown in FIGS. 7 and 8 are explained in detail in Japanese Laid-open patent application specification No. 55-2,570.

The holding member 11, engaging the change pawl metal 8, may be made of a leaf spring. Moreover, the pawl metal 8 may be formed integrally with a pivot shaft 9.

According to the invention, the distance $D_2$ between the center of the pivot shaft 9 and the winding-off direction holding engagement portion 13 of the change pawl metal 8 is larger than the distance $D_1$ between the center of the pivot shaft 9 and the winding-up direction holding engagement portion 12. Therefore, the urging forces of the winding-up driving pawl 6 and winding-off driving pawl 7 against the change gear 5 by the action of the engagement spring 10 can be very easily changed such that the force becomes small in winding-up operation and large in winding off operation. As the urging force of the winding-up driving pawl 6 is small, when a light load is hoisted up, the return movement of the operating lever 4 does not carry along or return the change gear 5 and hence the driving member 2. As the urging force of the winding-off driving pawl 7 is large, when the light load which does not operate the braking assembly is lowering, the large urging force of the winding-off driving pawl 7 prevents the change gear 5 from rotating against the driving pawl 7. In this manner, the lever hoist according to the invention can raise and lower light weight loads by operation of the lever without any trouble.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A lever hoist including a change gear provided on a driving member for driving a sheave about which is wound up a chain, rope or the like for a load, an operating lever rockable about said driving member by a hand, a winding-up driving pawl engageable with teeth of said change gear and driven by said operating lever in a winding-up direction for the load, a winding-off driving pawl engageable with the teeth of said change gear and driven by said operating lever in a winding-off direction for the load, and a braking assembly preventing said change gear from being driven from a side of said sheave and having an elastic resistance member directly or indirectly engaging said driving member for releasing said braking assembly, said lever hoist comprising urging means for urging said winding-up and winding-off driving pawls against said teeth of said change gear in a manner such that said winding-off driving pawl is urged against said teeth with a larger force than that of said winding-up driving pawl urged against said teeth, said urging means comprising an urging spring housed in said operating lever and a holding member urged by said urging spring so as to urge said winding-up and winding-off driving pawls against said teeth of said change gear, said winding-up and winding-off driving pawls being formed in a unitary member pivotally secured to said operating lever by means of a pivot shaft, opposite portions to said pawls of said unitary member being made engageable with said holding member and serving as winding-up and winding-off direction holding portions for holding said winding-up and winding-off pawls relative to said operating lever, respectively, and a distance between a center of said pivot shaft and said winding-off direction holding portion being larger than a distance between the center of said pivot shaft and said winding-up direction holding portion of said unitary member.

* * * * *